Sept. 8, 1953
W. A. RAY
2,651,326
DIAPHRAGM VALVE HAVING AN ADJUSTABLY MOUNTED PIVOTED PILOT VALVE
Filed Jan. 23, 1950
2 Sheets-Sheet 1
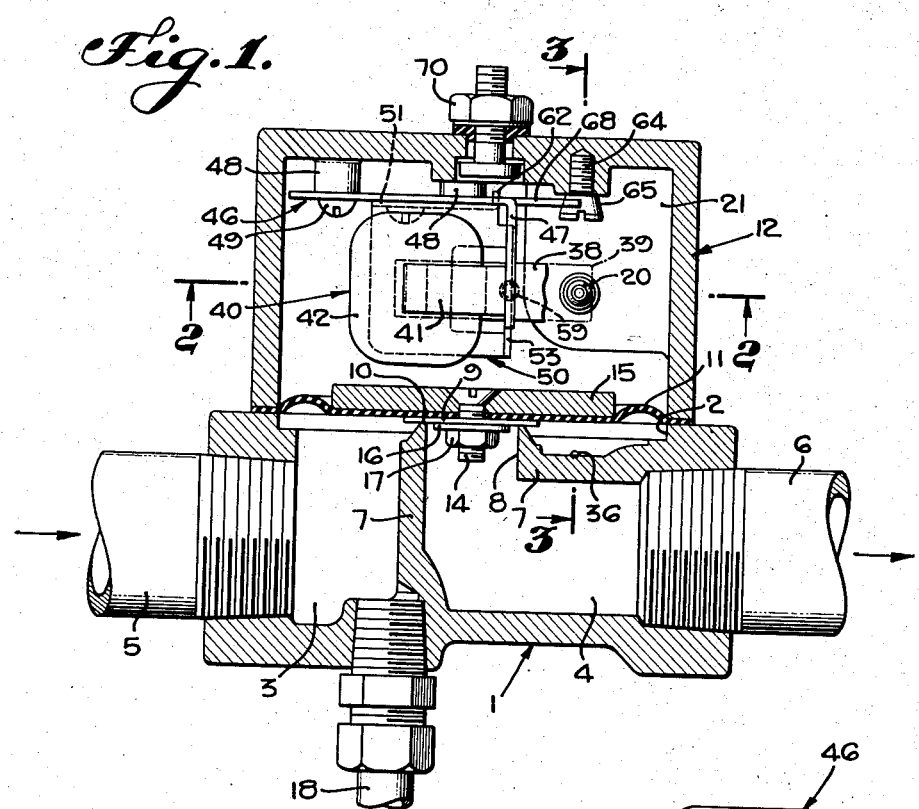
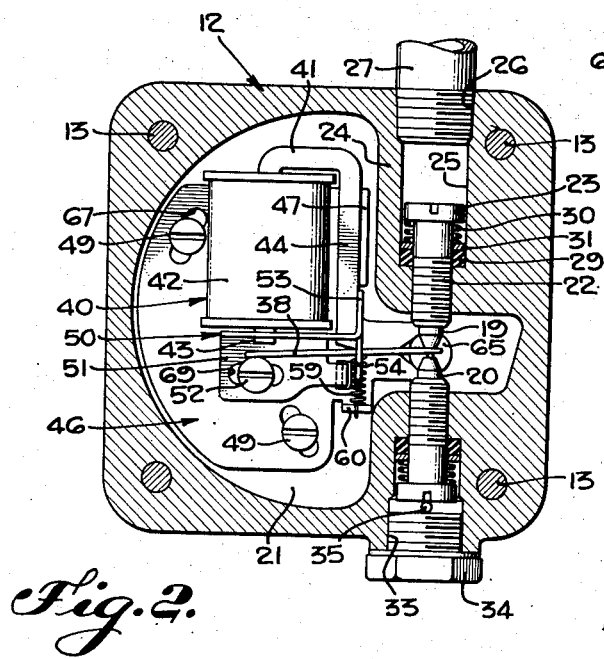
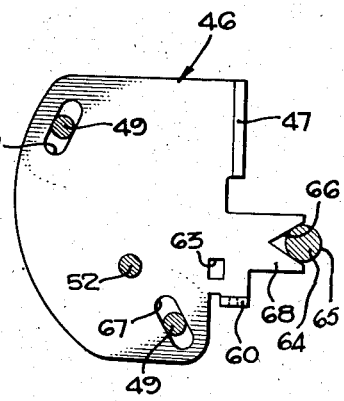
WILLIAM A. RAY,
INVENTOR.
BY John Flam
ATTORNEY Sept. 8, 1953
W. A. RAY
2,651,326
DIAPHRAGM VALVE HAVING AN ADJUSTABLY MOUNTED PIVOTED PILOT VALVE
Filed Jan. 23, 1950
2 Sheets-Sheet 2
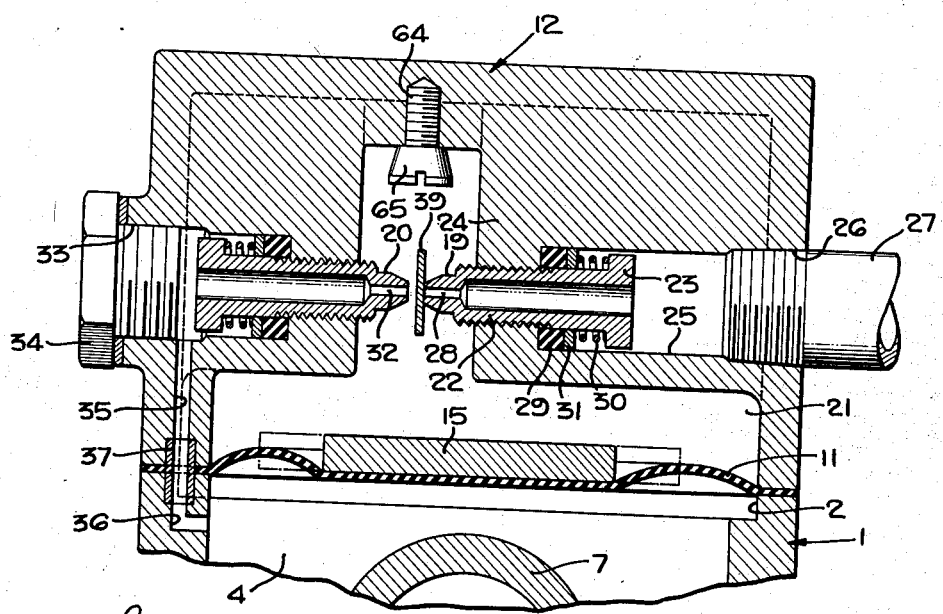
Fig. 3.
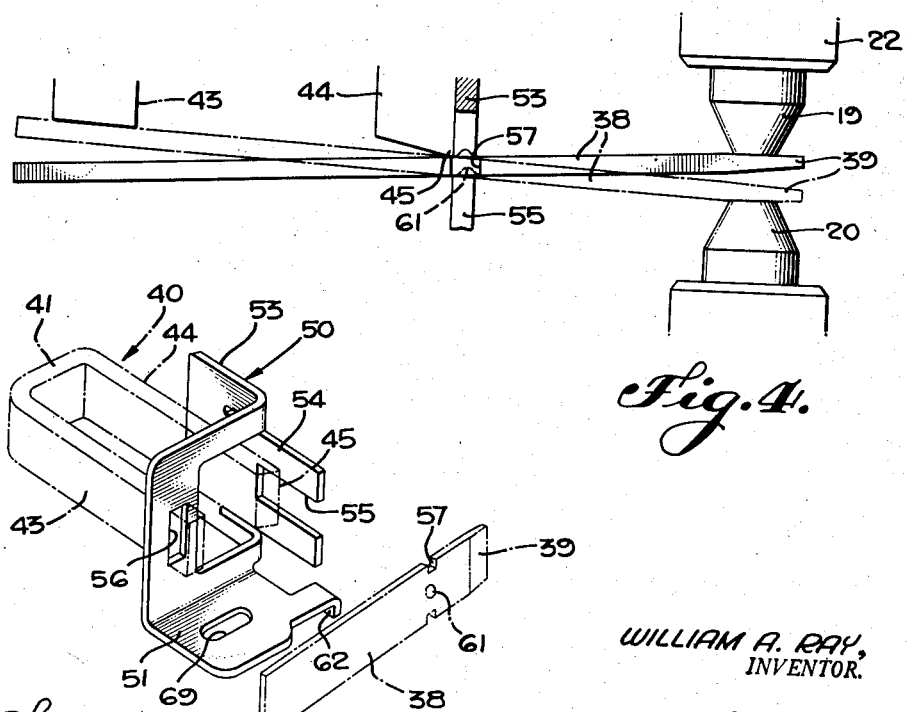
Fig. 4.
Fig. 6.
WILLIAM A. RAY,
INVENTOR.
BY John Flam
ATTORNEY Patented Sept. 8, 1953

2,651,326

UNITED STATES PATENT OFFICE 2,651,326

DIAPHRAGM VALVE HAVING AN ADJUSTABLY MOUNTED PIVOTED PILOT VALVE

William A. Ray, North Hollywood, Calif., assignor to General Controls Co., a corporation of California Application January 23, 1950, Serial No. 139,990

13 Claims. (Cl. 137—657)

This invention relates to a valve structure, and particularly to a structure utilizing the pressure of the medium for operating the valve.

More particularly, the valve structure incorporating the invention is utilized for controlling the flow of gaseous fuel to a burner. The valve closure for example may be mounted on a diaphragm, and the gas pressure urging the diaphragm to open or close the valve is controlled by a pilot valve. This pilot valve may be made responsive to a condition, such as temperature of a space or to the existence or non-existence of a pilot flame.

Such a valve is described in Patent No. 2,292,477 issued August 11, 1942, in the name of William A. Ray. The pilot valve structure in that patent includes a pair of jets in opposed relation. One jet member is in communication with the inlet side of the main valve, so that when the jet is open, gas pressure is applied to the diaphragm to urge the valve to closed position. The other jet member is connected to a place of lower pressure, such as to the atmosphere. When the first jet is open and the second jet is closed, the diaphragm is urged to valve closing position. Conversely, when the first jet is closed and the second jet is opened, the pressure on one side of the diaphragm is relieved, and the gas pressure is effective on the other side of the diaphragm to open the valve.

Control of the jets is effected by a pivotally mounted member that extends between the jets. The member may be an armature for an electromagnet energized by a thermocouple that responds to the pilot flame. Since only a minute power is available for the operation of the electromagnet, the armature is necessarily delicately mounted. Accordingly, the force used to seat the armature on the jet opening is also limited. Unless extreme care is exercised, the jet opening will not be completely closed and undesirable leaks occur.

It is one of the objects of this invention to make it possible to obviate imperfect seating of the jet controlling member, in a simple and inexpensive manner.

It is another object of this invention to improve in general, valve structures of this character.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a vertical section of a valve structure incorporating the invention;

Figs. 2 and 3 are sectional views, taken respectively along planes corresponding to lines 2—2 and 3—3 of Fig. 1;

Fig. 4 is a greatly enlarged fragmentary view of the jet members and associated parts;

Fig. 5 is a plan view of the mounting bracket for the operating parts of the pilot valve structure control; and Fig. 6 is a pictorial view of a bracket structure employed in connection with the valve.

The main valve body 1 is shown as having a large opening 2 at the top of the body, as well as an inlet chamber 3 and an outlet chamber 4. An inlet pipe connection 5 is threaded into the valve body for communication with the chamber 3. A pipe 6 is similarly threaded into the valve body 1 for communication with the outlet chamber 4.

Segregating these two chambers is a wall 7. A port 8 is defined in the valve body to permit communication with these chambers. A valve closure member 9 is arranged to rest on the narrow valve seat 10 that surrounds the port 8. This member 9 may be a yielding member, and is carried on the lower side of a flexible diaphragm 11. This flexible diaphragm 11 closes the opening 2 and is held in an appropriate sealing manner by the lower edge of a supplemental housing or casing 12 (see, also, Figs. 2 and 3). Bolts 13 (Fig. 2) serve to hold the housing 12 in place above the valve body 1.

In order to hold the valve closure member 9 against the lower surface of the diaphragm 11, a bolt 14 is used, passing through a heavy disc 15 on the upper side of the diaphragm 11. A washer 16 is disposed against the lower surface of the member 9, and a nut 17 serves to hold the valve closure assembly together.

The valve, in this instance, is intended to control the passage of a gaseous fuel to a burner.

In the position shown in Fig. 1, the valve is closed, and communication between the inlet chamber 3 and the outlet chamber 4 is interrupted. However, when the valve closure 9 is lifted, communication is established.

A conduit 18 is shown as leading to the inlet chamber 3. In this way, the pilot burner is supplied with fuel independently of the position of the closure member 9.

Opening and closing of the valve is effected by raising or lowering the diaphragm 11 in response to preponderance of pressure on one or the other side of the diaphragm 11.

In order to control this gas pressure, use is made of a pair of jet structures 19 and 20 that open into the chamber 21 formed within the casing 12. Jet structure 19 is formed by a hollow threaded member 22 having a slotted screw head 23. It engages threads in the wall 24 of the casing 12. Bore 25 leads to the threaded aperture, and is threaded at 26 for the accommodation of an exhaust conduit 27. A small bore 28 forms the jet opening.

In order to provide a fluid-tight structure, a yielding packing washer 29 is provided surrounding the jet member 22 in the aperture 24. A compression spring 30 acts on a washer 31 to urge the packing 29 into the bottom of the bore 25.

When the jet opening 28 is uncovered, the gas in chamber 21 is free to exhaust, and the inlet pressure operating on the lower side of the diaphragm 11 serves to move the diaphragm and the valve closure structure to the open position.

The jet structure 20 is similar to the jet structure just described. It has a jet opening 32 opposed to opening 28, and this opening 32 is in communication with the inlet chamber 3 of the valve body 1. For this purpose, a threaded aperture 33, in the wall of casing 12, is provided which is sealed by plug 34. A port 35 leads downwardly from this aperture and is in communication with a port 36 formed in the wall of casing 1. This port 36 opens into the chamber 3. A sleeve 37 is accommodated partly in the casing 12 and partly in the body 3, providing a tight connection between the ports 35 and 36 through the diaphragm 11.

When the jet opening 32 is open, as illustrated in Fig. 3, and the jet opening 28 is closed, inlet pressure is available above the diaphragm 11 through ports 36 and 35, and the jet opening 32, to urge the diaphragm 11 downwardly to close the valve. Since the area of the diaphragm 11 exposed to the inlet pressure on each side is substantially the same, the weight member 15 then causes the diaphragm 11 to be urged downwardly. As soon as closure 9 seats upon the seat 10, the area exposed to the pressure in chamber 21 is greater than the area exposed to the inlet chamber 3. Accordingly, this preponderance of pressure serves to hold the valve closure 9 firmly on its seat.

Control of the openings 28 and 32 is provided by control member 38. This is in the form of a thin member that has an operating end 39 which extends between the jets 19 and 20. In the present instance, the control member 38 is made of magnetic material to serve as an armature influenced by an electromagnet 40 (Figs. 1 and 2). This electromagnet has a U-shaped iron core 41 (Figs. 1 and 2). The coil 42 of the electromagnet is mounted upon one of the legs 43. The other leg 44 (see, particularly, Fig. 4) is provided with a knife-edge 45 that serves as a pivot for the armature 38.

For supporting the core 41, use is made of a bracket 46 (see, particularly, Figs. 2 and 5). This bracket 46 has a flange 47 to which the leg 44 is spot-welded. The bracket 46 is attached to a pair of bosses 48 projecting downwardly from the upper wall of casing 12. This is accomplished by the aid of a pair of screws 49 threaded into the bosses and passing through slots 67 of the bracket.

A supplementary bracket structure 50 (see Fig. 6) is provided having an aperture 56 for accommodating and supporting the polar end portion of the leg 43. This bracket member is made of sheet metal, and has a base portion 51 contacting the lower side of the bracket 46 and attached thereto, as by a screw 52. One portion of the supplementary bracket 50 is bent to provide a member 53 that closely contacts the outer surface of the core leg 44. A tongue 54 extends from the member 53 and is provided with a slot 55 for supporting the armature 38. This armature 38 is provided with slots 57, on opposite edges, to be accommodated between the opposed edges of the slot 55. In this way, the armature 38 is restrained against lateral movement.

A compression spring 59 urges the armature 38 to the unattracted position shown in Fig. 2. A tail end of the spring is accommodated in an aperture provided in the arm 60 of bracket 46. The other shorter tail end of the compression spring 59 is accommodated in a depression 61 formed in the armature 38 slightly beyond the knife edge 45.

Further to steady the bracket 50 with respect to the bracket 46, this bracket 50 has an outturned portion 62 that is accommodated in an aperture 63 in the bracket 46.

The operating end 39 of the armature 38 must quite accurately fit the end surfaces of the jet members 19 and 20; otherwise, gas leakage would occur. Difficulties are commonly encountered in providing such accuracy, since usually a lapping operation is required. By the aid of the present structure, this expensive process is obviated.

The operating end 39, as shown most clearly in Fig. 4, is very slightly tapered, its side surfaces converging toward the end. Angular movement of the armature 38 about the knife edge 45 is effected between limits by the electromagnet 40 when it is energized and deenergized. If the jet surfaces are parallel, and if the knife edge 45 is so located with respect to the jets 19 and 20 such that the tapered end 39 is movable symmetrically between the jets, the condition that must be fulfilled for accurate seating is as follows: The total angle of movement of the armature 38, such as is illustrated by the full-line and dotted-line position, must precisely correspond to the angle between the tapered end surfaces of the end 39. The extent of angular movement of armature 38 is, in turn, dependent upon the spacing between the opposed surfaces of the jets 19 and 20. If the tapered ends do not accurately seat against the parallel jet surfaces, then changing the distance of the knife edge 45 from the axis of the jet also adjusts the angle through which the armature 38 is movable.

The surfaces of the jets may be moved toward or away from each other by the aid of the threaded mounting of the jet members, such as by means of the slotted head 23. Also, the distance of the knife edge 45 from the axis of the jets can be adjusted in a manner to be hereinafter described.

In order to locate the knife edge in a position in which the tapered ends of the armature 38 are movable symmetrically between the jets, the bracket 46 is angularly adjustable. A pin 64 (Fig. 1), threaded into the upper wall of the casing 12, provides a pivotal mounting. It has a tapered head 65 forming a pivot surface proper, engaged by a V-notch 66 formed in an extension 68 of the bracket 46. In order to permit adjustment about the axis of the pin 64, the slots 67 for screws 49 are made arcuate about the axis of pin 64. These slots permit angular adjustment. Thus the axis about which this adjustment occurs corresponds with the axis of pin 64 which axis is normal to the axis of the jet openings 28 and 32. Furthermore, this axis of adjustment extends, as clearly shown in Fig. 3, centrally between the end surfaces of the jets, so that in making this adjustment, the spacing of the jet surfaces in determining the angle of movement of the armature 38 is substantially undisturbed.

The tapered surface 65 of pin 64 serves to restrain separation of the bracket 46 with respect to the pivot pin 64. Accurate positioning of the armature 38 can then be readily effected by careful angular adjustment of the bracket 46 and, consequently, the lateral arms supported on this bracket, including the electromagnet 40 and the armature 38.

The distance of the knife edge 45 from the jets may be adjusted by the aid of the supplementary bracket 50. Thus, the bracket 50 is adjustably secured to the main bracket 46, and is permitted to move in a direction toward or away from the jets 19 and 20 to a limited extent by the aid of the aperture 63 loosely receiving the outturned portion 62. The screw 52 secures the brackets 50 and 46 together and passes through an elongate slot 69 in the base 51 that permits the adjustment.

If the opposed surfaces of the jets 19 and 20 diverge along the direction of the armature, instead of being coplanar, then the condition that precision seating be achieved is that the angle of movement of the control member 38 corresponds either with the sum of the angle between the jet surfaces and the angle between the tapered ends of the control member, or the difference between these two values, depending upon the direction in which the surfaces are inclined to each other. Movement of the knife edge 45 is most effective in achieving this condition when the jet surfaces are inclined to each other.

Connections to the electromagnet 40 are provided by a pair of terminal structures 70 (Fig. 1) insulatingly mounted in the upper wall of the casing 12. The mounting is such as to seal the opening through which the terminal extends. The connections to the electromagnet may extend to a thermocouple structure influenced by the flame of a burner, such as an ordinary pilot burner, in a gas installation.

The inventor claims:

1. In a valve structure: a valve body having a ported partition and a valve seat around the port; a closure member cooperating with the seat; a movable wall carrying the closure member; means forming, with said wall, a pressure chamber; a pair of opposed jets in said chamber for passing a gaseous medium into and out of said chamber; a pivotally mounted control member projecting between the jets and movable to and from each of the jets, said member having opposite sides cooperating respectively with the jets to close them; said sides having surfaces that become coplanar with the end surfaces of the jets as the side surfaces engage said end surfaces; a mounting for the control member; and means pivotally and adjustably securing said mounting to said chamber forming means operable to permit angular adjustment of said mounting about an axis parallel to the axis of movement of said control member, said parallel axis passing between said jets.

2. In a valve structure: a valve body having a ported partition and a valve seat around the port; a closure member cooperating with the seat; a movable wall carrying the closure member; means forming, with said wall, a pressure chamber; a jet having an opening in said chamber for the passage of a gaseous medium; a jet control member mounted on an axis normal to but displaced from the axis of the jet opening; said member having a side surface for contacting the jet, and slanting in such manner that the jet surface and said side surface are coplanar when the control member contacts the jet; a mounting for the control member; and means pivotally and adjustably securing said mounting to said chamber forming means operable to permit angular adjustment of said mounting with respect to said jet about an axis parallel to the axis of movement of the control member, said parallel axis passing adjacent the jet opening.

3. In a valve structure: a valve body having a ported partition and a valve seat around the port; a closure member cooperating with the seat; a movable wall carrying the closure member; means forming, with said wall, a pressure chamber; a jet having an opening in said chamber for the passage of a gaseous medium; a member for opening and closing the jet; means providing a pivotal support for said member, the axis of the pivot being normal to but displaced from the axis of the jet opening; a bracket for the pivotal support; and a pin about which the bracket is adjustable angularly, said pin having an axis parallel to the axis of the pivot and adjacent the jet opening.

4. In a valve structure: a valve body having a ported partition and a valve seat around the port; a closure member cooperating with the seat; a movable wall carrying the closure member; a jet having an opening in said chamber for the passage of a gaseous medium; a member for opening and closing the jet; means providing a pivotal support for said member, the axis of the pivot being normal to but displaced from the axis of the jet opening; a bracket for the pivotal support; and a pin about which the bracket is adjustable angularly, said pin having an axis parallel to the axis of the pivot and adjacent the jet opening; said pin having a tapered portion received in a notch of the bracket.

5. In a valve structure: a valve body having a ported partition and a valve seat around the port; a closure member cooperating with the seat; a movable wall carrying the closure member; means forming, with said wall, a pressure chamber; a pair of opposed jets in said chamber for passing a gaseous medium into and out of said chamber; a pivotally mounted control member projecting between the jets and movable to and from each of the jets, said member having opposite sides cooperating respectively with the jets to close them; said sides having surfaces that become coplanar with the end surfaces of the a mounting for the control member; means pivotally and adjustably securing said mounting to said chamber forming means operable to permit angular adjustment of said mounting with respect to said jets about an axis parallel to the axis of movement of the control member, said parallel axis passing intermediate the jet members; an electromagnet for moving said control member; and means biasing said control member toward one of the jets.

6. In a valve structure: a valve body having a ported partition and a valve seat around the port; a closure member cooperating with the seat; a movable wall carrying the closure member; means forming, with said wall, a pressure chamber; a jet having an opening in said chamber for the passage of a gaseous medium; a member for opening and closing the jet; means providing a pivotal support for said member, the axis of the pivot being normal to but displaced from the axis of the jet opening; a bracket for the pivotal support; a pin about which the bracket is adjustable angularly, said pin having an axis parallel to the axis of the pivot and adjacent the jet opening; an electromagnet for moving said control member; and means biasing said control member against the force of the electromagnet.

7. In a valve structure: a pair of jets having opposed openings for passing a gaseous medium through the jets; a pivotally mounted control member projecting between the jets and movable to and from each of the jets, said member having opposite sides cooperating respectively with the jets to close them; said sides having surfaces that become coplanar with the end surfaces of the jets; a mounting for the control member; and means pivotally and adjustably securing said mounting with respect to said jets operable to permit relative angular movement therebetween about an axis normal to the jet axes and between said jet openings.

8. In a valve structure: a jet having an opening for passing a gaseous medium through the jet; a jet control member mounted on an axis normal to but displaced from the axis of the jet opening; said member having a side surface for contacting the jet, and slanting in such manner that the jet surface and said side surface are coplanar when the control member contacts the jet; a mounting for the control member; and means pivotally and adjustably securing said mounting with respect to said jet operable to permit relative angular movement therebetween about an axis parallel to the axis of movement of the control member, said parallel axis being normal to the jet axis and adjacent said opening.

9. In a valve structure: a jet having an opening for the passage of a gaseous medium; a member for opening and closing the jet; means providing a pivotal support for said member, the axis of the pivot being normal to but displaced from the axis of the jet opening; and a bracket for the pivotal support; a pin about which the bracket is angularly adjustable; said pin having an axis parallel to the axis of the pivot and adjacent the jet opening.

10. In a valve structure: a pair of jets having opposed openings for passing a gaseous medium through the jets; a pivotally mounted control member projecting between the jets and movable to and from each of the jets, said member having opposed sides cooperating respectively with the jets to close them; said sides having surfaces that become coplanar with the end surfaces of the jets when said side surfaces engage said end surfaces; a bracket for the control member; and means pivotally and adjustably securing said bracket with respect to said jets operable to permit relative movement therebetween in a direction normal to the axes of said jet openings, as well as transverse to the axis of pivotal movement of said control member.

11. In a valve structure: a pair of jets having opposed openings for passing a gaseous medium through the jets; a pivotally mounted control member projecting between the jets and movable to and from each of the jets, said member having opposed sides cooperating respectively with the jets to close them; said sides having surfaces that become coplanar with the end surfaces of the jets when said side surfaces engage said end surfaces; a bracket for the control member; a mounting for said bracket; means pivotally and adjustably securing said mounting with respect to said jets operable to permit relative angular movement therebetween about an axis normal to the axes of said jet openings and between said jet openings; and means adjustably securing said bracket on said mounting operable to permit relative movement therebetween in a direction normal to the axes of said jet openings, as well as transverse to the axis of pivotal movement of said control member.

12. In a valve structure: a valve body having a ported partition and a valve seat around the port; a closure member cooperating with the seat; a movable wall carrying the closure member; means forming, with said wall, a pressure chamber; a pair of jets having opposed openings in said chamber for passing a gaseous medium into and out of said chamber; and a control unit insertable in said chamber, comprising a control member adapted to project between said jets and pivotally movable between them, said control member having opposite sides cooperable respectively with the jets to close them, said sides having surfaces that become coplanar with the end surfaces of the jets when said side surfaces engage said end surfaces; an operator for the control member; a bracket securing said operator and guiding said control member for cooperation with said operator; a mounting for said bracket; means adjustably securing said bracket to said mounting; means adjustably securing said mounting with respect to said jets; one of said adjustable securing means being operable to permit movement of the axis of pivotal movement of said control member in a direction toward and away from said jet openings, and the other of said adjustable securing means being pivotally mounted to permit angular movement of said axis about an axis passing between said jet openings.

13. In a valve structure: a valve body having a ported partition and a valve seat around the port; a closure member cooperating with the seat; a movable wall carrying the closure member; means forming, with said wall, a pressure chamber; a pair of jets having opposed parallel openings in said chamber for passing a gaseous medium into and out of said chamber; a control member mounted on an axis normal to, but displaced from, the axes of the jet openings, said member having opposite sides cooperating respectively with the jet openings to close them, said sides having surfaces substantially equally and oppositely inclined with respect to said axis of said control member; means guiding said control member for pivotal movement about its axis; and means pivotally and adjustably securing said guiding member with respect to said jets, operable to permit movement of said guiding member in a direction to translate said axis in a direction toward or away from said jet openings, and operable to permit angular movement of said guiding member in a direction to move said control member axis about an axis normal to the axes of said jet openings and passing between said jet openings.

WILLIAM A. RAY.

References Cited in the file of this patent

UNITED STATES PATENTS

| Number | Name | Date |
|---|---|---|
| 1,072,998 | Shaw | Sept. 9, 1913 |
| 2,035,966 | Hubbard | Mar. 31, 1936 |
| 2,292,477 | Ray | Aug. 11, 1942 |
| 2,427,235 | Smoot | Sept. 9, 1947 |

FOREIGN PATENTS

| Number | Country | Date |
|---|---|---|
| 112,625 | Sweden | Dec. 5, 1944 |